C. O. BLACKWELL.
RESILIENT WHEEL.
APPLICATION FILED JAN. 29, 1916.
1,196,424.
Patented Aug. 29, 1916.
2 SHEETS—SHEET 2.
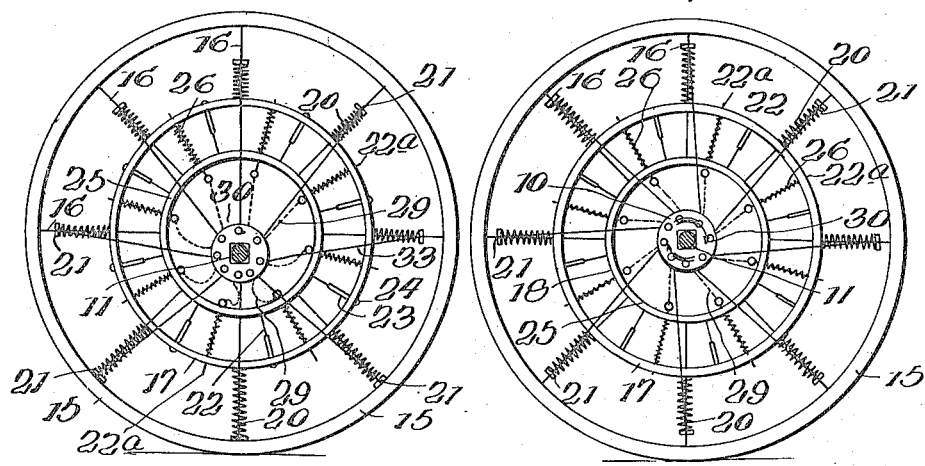
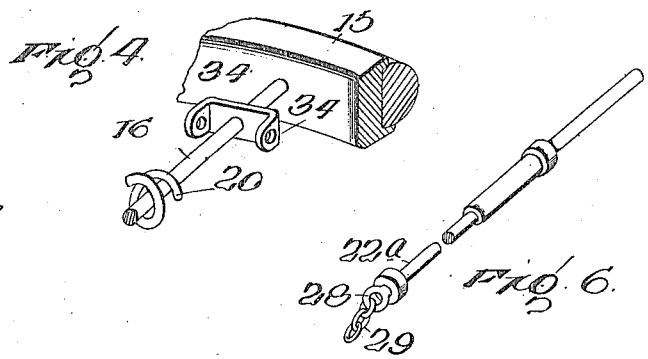
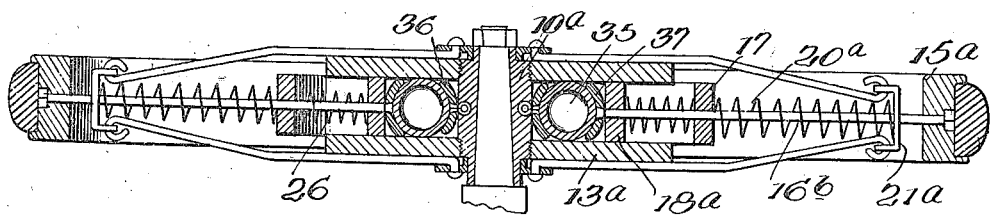
Inventor
C. O. Blackwell
By Watson E. Coleman
Attorney

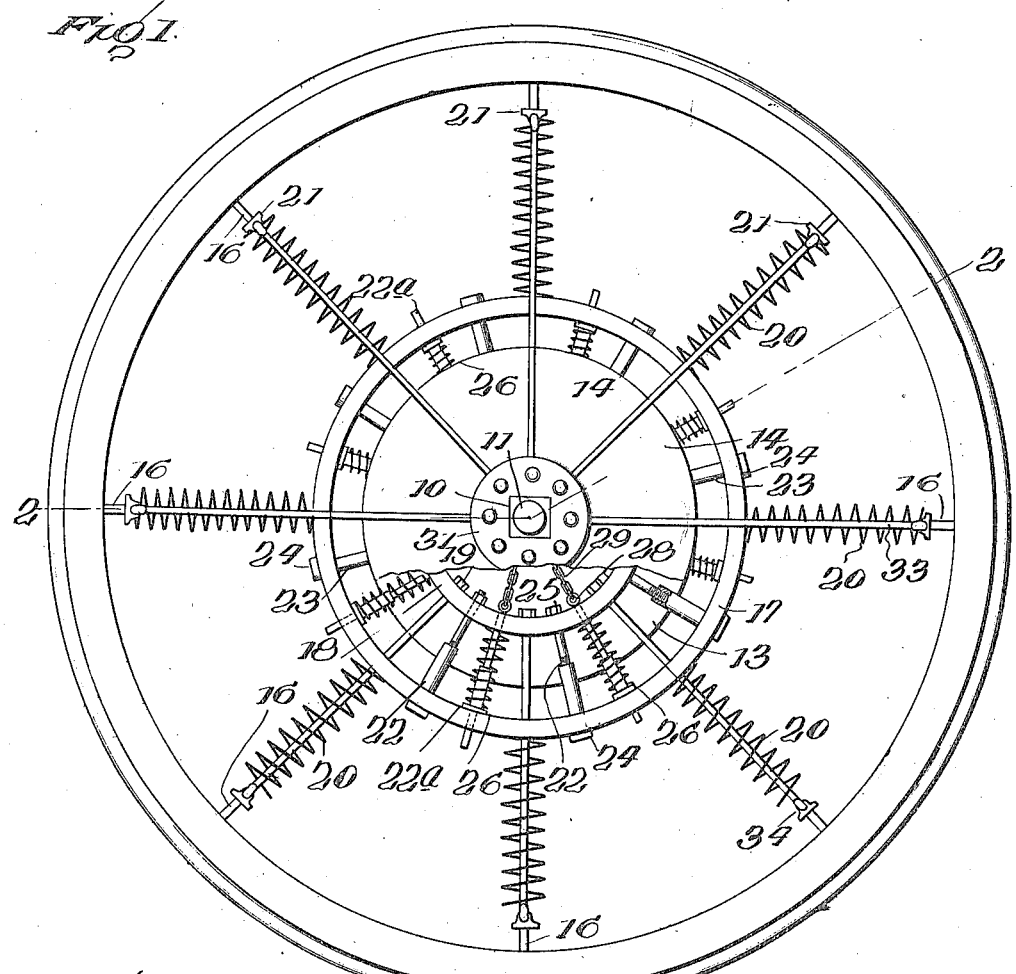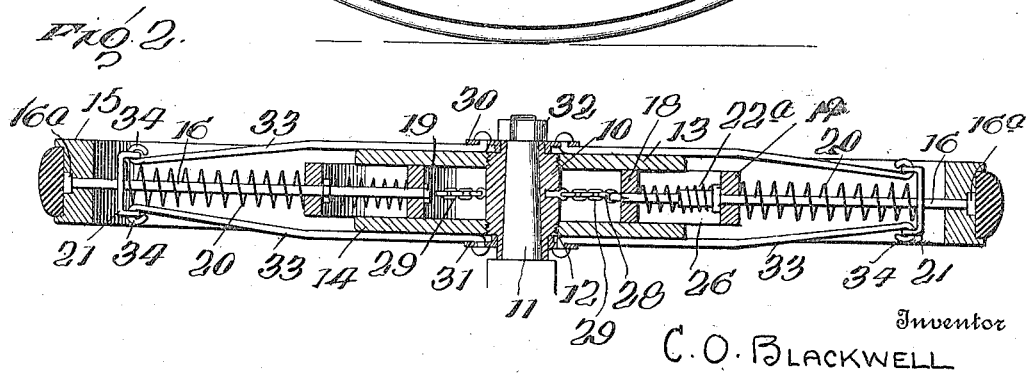

UNITED STATES PATENT OFFICE.

CHARLES O. BLACKWELL, OF HANNA, WEST VIRGINIA.

RESILIENT WHEEL.

1,196,424. Specification of Letters Patent. Patented Aug. 29, 1916.

Application filed January 29, 1916. Serial No. 75,156.

*To all whom it may concern:*

Be it known that I, CHARLES O. BLACKWELL, a citizen of the United States, residing at Hanna, in the county of Wood and State of West Virginia, have invented certain new and useful Improvements in Resilient Wheels, of which the following is a specification, reference being had to the accompanying drawings.

This invention relates to resilient wheels, and particularly to resilient wheels of that type wherein springs are used disposed between a rim section and a hub section.

The general object of the invention is the provision of a resilient wheel of the character above stated, which is so constructed that the rim will shift with relation to the hub, this shifting of the rim relative to the hub being resiliently resisted, and wherein strains exerted in a circumferential direction will also be resiliently resisted.

Still another object of the invention is the provision of a resilient hub wherein the parts may be readily disengaged from each other or assembled so that in case anything breaks the wheel may be readily repaired.

A further object of the invention is the provision of a wheel of this character wherein the hub section is hingedly connected to the spokes of the rim section to thus permit the hub section to yield in all directions relative to the rim section.

Other objects will appear in the course of the following description.

My invention is illustrated in the accompanying drawings, wherein:

Figure 1 is a side elevation of a wheel constructed in accordance with my invention, partly broken away; Fig. 2 is a sectional view on the line 2—2 of Fig. 1; Fig. 3 is a fragmentary elevation, partly broken away, showing the position taken by the parts when the hub is depressed relative to the rim; Fig. 3$^a$ is a like view to Fig. 3 but showing the position of the parts when the hub has shifted rotatably relative to the rim; Fig. 4 is a perspective view of a portion of the rim and its spokes; Fig. 5 is a perspective view of a means for holding the inner and outer annuli in concentric relation; Fig. 6 is a perspective view of the bolts which connect the inner and outer annuli; Fig. 7 is a diametrical section of another form of my invention.

Referring to these drawings and particularly to Figs. 1 and 2, 10 designates the hub of the wheel which is apertured for the passage of the axle skein 11 or is connected to the axle in any other suitable manner. The ends of the hub 10 are reduced and inward of such reduced portions the hub is screw threaded as at 12 for engagement with the outer and inner disks 13 and 14 which are designed to rotate with the hub and move with it.

Disposed normally concentric with the hub is a rim 15 having a plurality of inwardly extending spokes 16, the outer ends of which carry countersunk nuts 16$^a$. Disposed between the rim and the hub are the outer and inner annuli 17 and 18. The annulus 18 is smaller in diameter than the disks 13 and 14. The spokes 16 pass through the outer annulus 17 and at their inner ends pass through the annulus 18 and are provided with nuts 19 which limit their outward movement relative to the annulus 18. Surrounding the spokes 16 outward of the annulus 17 are coiled springs 20 whose outer ends bear against certain yokes 21 which are slidably mounted upon the spokes 16 and which are connected to the hub as will be later stated.

Disposed between the spokes 16 are a plurality of sectional bolts 22 and 22$^a$, one section comprising an internally screw threaded socket 23 having a head 24 bearing against the periphery of the outer annulus 17 and the other section being screw threaded for engagement with the section 23 and extending inward through the inner annulus 18 and being provided with a nut 25. The bolts 22$^a$ are surrounded by coiled springs 26 which at their inner ends bear against the inner annulus and at their outer ends bear against the inner faces of the annulus 17 and yieldingly hold the annuli in concentricity. The inner ends of the bolts 22$^a$ are formed with eyes 28 from which chains 29 extend to the hub to which they are attached as illustrated clearly in Fig. 2. The outer ends of the bolts 22$^a$ extend loosely through the annulus 17. The springs 26 resist movement of the hub out of concentricity with the annulus but yield to permit such movement.

Attached to the ends of the hub 10 in any suitable manner are outer and inner disks 30 and 31, the outer disk having preferably a square aperture to engage over the squared reduced end of the hub, while the inner plate or disk is preferably shrunk upon the hub. The plate 30 is held in place upon the hub by means of a nut 32 engaging the axle skein. Each of these plates 30 and 31 is connected to the yokes 21 by means of connecting rods 33. These rods at their inner ends are laterally bent and pass through apertures in the plate 30 so that the rods may move in a plane parallel to the plane of the plate to which they are hinged, while the outer ends of the rods are bent as at 34 and engage in eyes formed in the inwardly turned ends of the corresponding yoke 21.

The manner in which the resilient wheel acts is as follows: The depression of the hub relative to the rim shifts the hub downward relative to the annuli. This will cause those rods 33 which extend upward from the hub to be drawn downward thus compressing the springs 20 surrounding the rods. At the same time those chains 29 which extend upward are drawn downward and the springs 22 will be compressed. Those spokes 16 which extend downward from the hub slip through the outer and inner annuli as the hub moves downward. The downward movement of the hub with relation to the rim is permitted by the hinged connection of the spokes 16 to the yokes 21 and to the plates 30 and 31 and is also permitted by the flexible connection between the hub and the bolts 22ª constituted by the chains 29.

A certain amount of independent rotative movement of the hub relative to the rim is also permitted by the hinged rods 33 and the flexible chains 29 but as soon as the hub has rotated a certain limited distance relative to the rim the rod 16 will begin to compress the springs 20 and the chains 29 will also cause the compression of the springs 20 until the hub and wheel are rotated together. Thus all shocks and strains either in directions radial to the hub or tangential to the hubs are taken up and cushioned. It will be seen that my invention permits of a movement of the hub relative to the rim, which movement, however, is resisted in all directions by a compression of certain springs. It is further to be noted that the wheel as constructed may be readily assembled or disassembled. Thus the spokes 16 may be disengaged from the rim by disengaging the nuts 16ª and pulling out the spokes. By releasing the rods 33 the springs and yokes may be readily slipped off of the spokes 16 and by disconnecting the two sections of the bolts 22 and 22ª the outer and inner annuli may be readily disengaged from operative relation to each other and the springs 27 withdrawn. It will be obvious of course that the wheel may be inclosed though I have shown it open so as to show all of the details of construction.

In Fig. 7 I show another form of my improved wheel which is exactly the same as that shown in Figs. 1 and 2 except for the fact that a pneumatic tire, designated 35, is disposed between the hub and the inner spoke rim 18. In Fig. 7, 10ª designates the hub, 13ª the side plates, 15ª the rim, 16ᵇ the spokes surrounded by the springs 20ª, and 18ª designates the inner spoke ring. The chains 29 are left off and an inner trough-shaped annulus 36 is attached to the hub by means of the eyes which ordinarily connect the chains 29 to the hub, and an outer trough-shaped rim 37 is connected in any suitable manner to the inner face of the annulus 18ª. This wheel, as illustrated, operates in exactly the same manner as the wheel previously described except as regards the chains 29.

Having described the invention, what I claim is:

1. In a resilient wheel, a hub, a rim, a plurality of annuli disposed between the rim and hub, spokes mounted upon the rim and having engagement through the annuli, plates mounted upon the hub, yokes surrounding the spokes, rods operatively connecting said plates to the yokes, springs disposed between the annuli and the yokes, bolts connecting the annuli, bolts having sliding engagement with the annuli and disposed radial to the hub, springs surrounding said yokes, and flexible connections between the hub and said last named bolts.

2. In a resilient wheel, a hub, a rim, an annulus disposed between the rim and hub and within which the hub is movable, spokes extending from the hub and engaging the said annulus, means for yieldably engaging said annulus with the hub, said means permitting a limited rotative movement of the hub independent of the annulus, springs surrounding the spokes and disposed between the rim and annulus, and rods having pivotal engagement with the hub and operatively engaging the outer ends of said springs whereby to cause a compression of certain of the springs upon a rotative movement of the hub relative to the rim and annulus.

3. In a resilient wheel, a hub, a rim, concentric outer and inner annuli spaced from the hub and rim, spokes extending inward from the rim and passing through the annuli, plates operatively mounted upon the hub to move therewith, yokes slidingly mounted on the spokes, and springs disposed between the outer annulus and said yokes, rods hingedly connected to the yokes and to the plates whereby a rotary movement of a radial movement of the hub will cause the compression of said springs, bolts holding the annuli in spaced relation, bolts having sliding engagement with both annuli and flexibly connected to the hub, and springs surrounding said bolts and disposed between the annuli and compressed by the radial or rotative movement of the hub relative to the annuli.

4. In a wheel of the character described, a hub, disks disposed on both ends of the hub, a rim concentric to the hub, outer and inner annuli concentric to the hub, the inner annuli being disposed between said disks, spokes extending inward from the rim and engaging the outer and inner annuli, plates mounted upon the ends of the hub, yokes mounted upon the spokes, springs disposed between the outer annulus and said yokes, connecting rods hingedly connected to the yokes and to said plates, bolts extending inward from the outer annulus and through the inner annulus and holding the annuli in concentric position, bolts extending between the outer and inner annuli and having sliding engagement therewith, each bolt having a head normally bearing against the inner face of the outer annulus, springs surrounding said last named bolts and bearing against said heads and chains connecting the hub to the inner ends of said last named bolts.

5. In a resilient wheel, a hub, a rim concentric thereto, an annulus surrounding the hub and connected thereto for limited circumferential movement, radially disposed spokes operatively connected to the rim and to the annulus, springs surrounding the spokes, and yieldably holding the annulus and rim in concentricity, and rods pivotally connected to the hub and having sliding and rotatable engagement with the spokes and bearing against the outer ends of the springs whereby the relative depression of the hub will cause the compression of the springs, or a relative rotation of the hub will cause a compression of the springs.

In testimony whereof I hereunto affix my signature in the presence of two witnesses.

CHARLES O. BLACKWELL.

Witnesses:
E. J. DOLLMAN,
R. A. DOLLMAN.